United States Patent [19]

Witney

[11] Patent Number: 5,321,638

[45] Date of Patent: Jun. 14, 1994

[54] CALIBRATED SENSOR SYSTEMS AND METHODS OF MANUFACTURING SAME

[76] Inventor: Keith C. Witney, 2-11771 Kingfisher Dr., Richmond, British Columbia, Canada, V7E 3T1

[21] Appl. No.: 824,685

[22] Filed: Jan. 21, 1992

Related U.S. Application Data

[63] Continuation of Ser. No. 516,507, Apr. 30, 1990, abandoned.

[51] Int. Cl.⁵ ............................................. G01C 25/00
[52] U.S. Cl. ........................... 364/571.05; 364/571.01; 73/1 R
[58] Field of Search ...................... 364/571.01, 571.05, 364/571.07, 550, 551.01, 579; 73/1 R, 1 D, 1 B, 708, 517 R

[56] References Cited

U.S. PATENT DOCUMENTS

| | | | |
|---|---|---|---|
| 4,063,447 | 12/1977 | Mathison | 364/571.01 X |
| 4,399,515 | 8/1983 | Gross | 364/571.04 |
| 4,481,596 | 11/1984 | Townzen | 364/571.01 |
| 4,598,381 | 7/1986 | Cucci | 364/571.05 |
| 4,602,871 | 7/1986 | Hanaoka | 364/571.03 X |
| 4,672,566 | 6/1987 | Asano et al. | 364/571.02 |
| 4,845,649 | 7/1989 | Eckardt et al. | 364/571.02 |
| 4,873,655 | 10/1989 | Kondraske | 364/571.02 X |
| 4,896,282 | 1/1990 | Orwell | 364/571.01 X |
| 4,926,341 | 5/1990 | Guyot | 364/571.01 X |
| 4,951,236 | 8/1990 | Kawate et al. | 364/571.01 |
| 4,956,795 | 9/1990 | Yamaguchi et al. | 364/571.03 |
| 4,980,847 | 12/1990 | Hirano | 364/571.03 |
| 4,982,351 | 1/1991 | Kawate et al. | 364/571.01 |
| 5,018,087 | 5/1991 | Dannenberg | 364/571.01 |
| 5,038,306 | 8/1991 | Kellett | 364/571.01 |
| 5,051,937 | 9/1991 | Kawate et al. | 364/571.01 |
| 5,060,504 | 10/1991 | White et al. | 73/1 D |
| 5,089,979 | 2/1992 | McEachern et al. | 364/571.04 |

Primary Examiner—Jack B. Harvey
Assistant Examiner—Edward Pipala
Attorney, Agent, or Firm—Townsend and Townsend Khourie and Crew

[57] ABSTRACT

A method of calibrating a sensor unit having a sensor for providing a sensor output in response to a stimulus and a microprocessor for correcting the sensor output including the steps of subjecting the sensor unit to the stimulus and varying the stimulus to obtain outputs from the sensor unit microprocessor and from a reference sensor unit in response to the stimulus, comparing the output values to derive correction data therefrom, and storing the correction data in the microprocessor for use in subsequently correcting the sensor unit output.

2 Claims, 3 Drawing Sheets

CALIBRATED SENSOR SYSTEMS AND METHODS OF MANUFACTURING SAME

This is a continuation of application Ser. No. 07/516,507 filed Apr. 30, 1990, now abandoned.

FIELD OF THE INVENTION

The present invention relates to calibrated sensor systems for use, for example, in sensing accelerations, pressures, heat, fluid flow or sound, and to methods of manufacturing calibrated sensor systems.

BACKGROUND OF THE INVENTION

Sensors are at the present time manufactured by micro-machining, using proven semi-conductor processing techniques to sculpt patterns onto thin pieces of silicon in order to create microscopic sensors for sensing pressure, heat, acceleration, flow or sound. Because they are made using processes adaptable to large scale manufacturing, the cost of such sensors is limited by testing and assembly requirements, rather than by manufacturing costs.

Small pressure transducers offered the first large scale market for this technology and, for this reason, development work has tended to be concentrated on such transducers. Pressure transducers have therefore been built using these techniques for over a decade, and have established mass markets in the military, aerospace, transportation and medical fields. Specialist sensors, such as accelerometers, mass flow devices and mechanical vales, have, however, been developed in the laboratory. Recently, in anticipation of the automotive market's need for engine knock sensors, smart suspensions and air bags, prototype runs of accelerometers have been made to validate the techniques and processes involved.

However, although their costs of manufacture are low, prior art micro-machined sensors have significant cost components, which are related to both their calibration and to the interfaces to the computers which they are associated.

Thus, a prior art calibrated micro-machined accelerometer transducer provided with interface electronics may cost, for example, $140.00. Of this amount, the cost of the transducer may well be less than $5.00, and the balance of the cost is made up by the costs of calibration, documentation and marketing expenses.

In fact, a major difficulty in producing a low cost accelerometer at high volume lies in the calibration of the accelerometer, which is required to provide a usable product.

At the present time, when an accelerometer has been manufactured, it is given a functional test. Devices which pass this test must then be mounted on an additional circuit board, containing amplifiers, power regulators and compensation circuitry, and must then be calibrated and "adjusted" to meet specifications. This is a time-consuming manual operation, which very substantially increases the price. If the accelerometer cannot be brought to specification, the circuit board must be reworked.

The result of all this work is a transducer which is similar to a laboratory device, which still cannot be directly interfaced to a computer and which requires still more circuitry and consequential expense and calibration time to become useful.

As will be readily appreciated by those skilled in the art, micro-machined sensors develop output values which vary from true sensed inputs in linearity and offset and due to temperature and other effects.

It is, of course, possible to ascertain the value of an input stimulus to the sensor either by employing a reference sensor device or by employing a known stimulus, such as the gravitational field of the earth. Provided that a means is available to calculate the differences between reference values ascertained in this way and the output values of the sensor and its associated circuitry, it is possible to generate a correction table or function, i.e. a plurality of correction values, which can be utilized to provide a more accurate representation of the true sensed input.

The present invention arises from a realization that the determination of these correction values normally requires more processing power than can be contained in the circuitry associated with the sensor and that the correction values need to be provided to such circuitry in a form in which they can be stored and used to continuously correct the output values of the sensor in use.

BRIEF SUMMARY OF THE INVENTION

It is accordingly an object of the present invention to provide a novel and improved method of manufacturing a calibrated micro-machined sensor system.

It is a further object of the present invention to manufacture a sensor system by combining a micro-machined sensor and a microprocessor and storing calibration correction values in the microprocessor for correcting the output values of the sensor.

It is a still further object of the invention to provide a method of manufacturing a calibrated sensor system combining a micro-machined sensor and a microprocessor for interfacing the sensor with apparatus external to the sensor system.

According to the present invention, a method of manufacturing a calibrated sensor system comprises the steps of providing a micro-machined sensor in die form, providing a microprocessor in die form and interconnecting the sensor and the microprocessor to form a sensor assembly. The sensor in the sensor assembly is then subjected to a calibration test, to obtain correction values corresponding to the difference between test values obtained from the sensor by the calibration test and reference values. The different values are then stored in the microprocessor and, when the sensor system is in use, are employed to provide calibrated outputs from the microprocessor in response to output values from the sensor.

The step of calibration sensing preferably includes subjecting both the sensor assembly and a reference sensor to a calibration stimulus and employing the reference sensor to provide the reference values.

The present invention further provides a sensor assembly comprising a sensor and correction means responsive to sensor values, provided by the sensor in response to a stimulus sensed by the sensor, for modifying the sensor values to provide calibrated output values. The correction means comprise a processor, means interconnecting the processor and the sensor to provide a sensor assembly and means in the processor for storing correction values corresponding to the difference between the sensor values and calibration reference values. The sensor and the processor are preferably enclosed in a common package.

BRIEF DESCRIPTION OF THE DRAWINGS

Further features, objects and advantages of the present invention will be more readily apparent to those skilled in the art from the following description of the present invention when taken in conjunction with the accompanying drawings, in which.

DESCRIPTION OF THE PREFERRED EMBODIMENT

Figure 1:
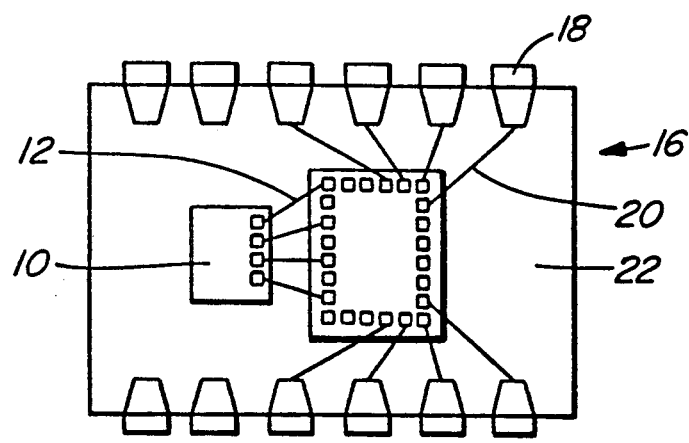
FIG. 1 shows a diagrammatic plan view of a sensor system embodying the present invention.

Referring firstly to FIG. 1 of the accompanying drawings, which diagrammatically illustrates a sensor system embodying the present invention, a micromachined acceleration sensor 10 is shown bonded by conductors 12 to a microprocessor 14. The sensor 10 and microprocessor 14 are incorporated in a single package indicated generally by reference numeral 16, which is provided with output terminals 18 connected to the microprocessor 14 by conductors 20, the sensor 10 and the microprocessor 14 being mounted on a common carrier 22.

Because a sensor system as shown in FIG. 1 and as described above is not yet enclosed in a protective case, it is very inexpensive. The sensor 10 and the microprocessor 14, both in die form and both having been functionally tested, are mounted on the carrier 22 by automated wire bonding to provide the sensor system as shown, which can then be calibrated as described below.

In the present embodiment of the invention, the sensor is a NOVA AS series sensor, while the microprocessor 14 is a Motorola MC68HCO5B6 microprocessor. It will, however, be understood that the invention is not in any way restricted to such microprocessors and sensors, but may employ any of a large number of commercially available or custom made devices. Thus, it is advantageous to use a microprocessor with most of the required support, such as memory and digital and analogue interfaces, built in so as to limit the additional circuitry required. The circuit includes a power source for the sensor and the microprocessor, in addition to the sensor 10 and the microprocessor 14. The output of the sensor 10 which, in the case of the above-mentioned NOVA AS sensor, is of the Wheatstone bridge type, is converted from analogue to digital in the microprocessor, which then corrects this output as described in greater detail below.

Figure 2:
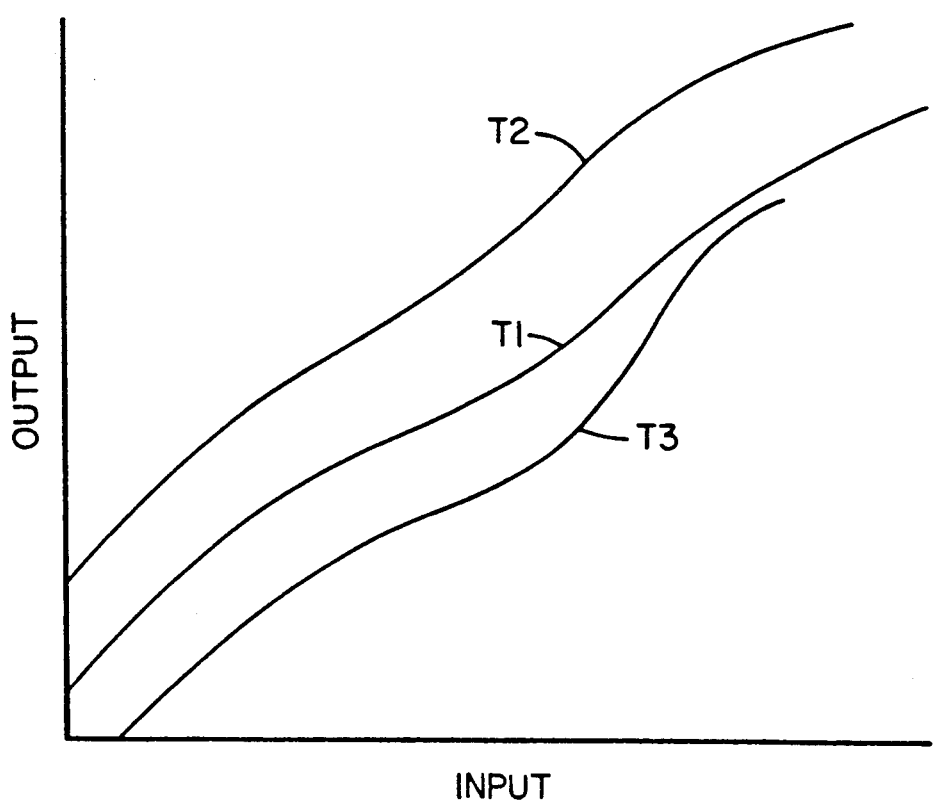
FIG. 2 shows a graph illustrating the relationship between the output voltage of a sensor and associated circuitry with respect to reference stimulus and a second stimulus.

Referring now to FIG. 2 of the drawings, which illustrates the need for correction of the output values of the sensor 10, there is shown in this figure the output values of a typical transducer, plotted along the ordinate, relative to a reference input, which is plotted along the abscissa and which, in the present case, represents acceleration, for three different values of an additional stimulus such as temperatures T1, T2 and T3.

It will be observed from FIG. 2 that the curves shown therein have different shapes and do not start at 0, i.e. are offset. It will be apparent, therefore, that there is considerable variation in the output of the sensor, in response to a range of accelerations, and in response to different temperatures, and that such variations require correction.

Figure 3:
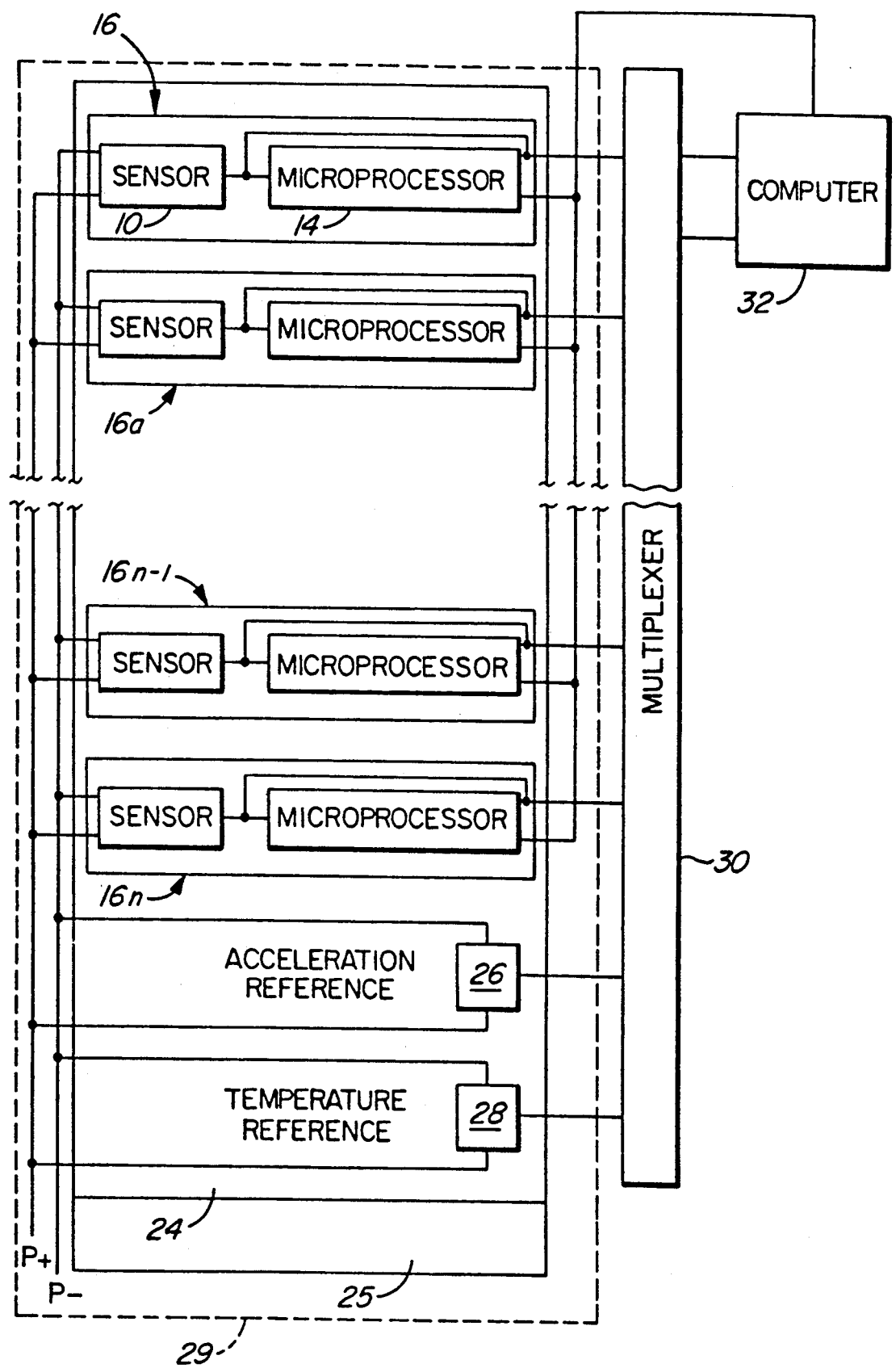
FIG. 3 shows a block diagram of apparatus for calibrating a sensor system embodying the present invention and FIG. 4 shows a flow chart illustrating a method of calibrating a sensor system using the apparatus of FIG. 2.

FIG. 3 of the drawings diagrammatically illustrates a vibration transducer calibration system for use in calibrating the sensor system of FIG. 1. One type of commercially available calibration system which is suitable for this purpose is that sold as Type 9610 by Bruel & Kjaer.

As shown in FIG. 3, a plurality of sensor systems 16a, 16b, ... 16n, each being similar to the sensor system 16 of FIG. 1 and, therefore, each comprising a sensor 10 and a microprocessor 14, are arranged for simultaneous calibration. Power is supplied to each of the sensor systems from input terminals P1, P2, to which a voltage of 5 volts DC is applied.

The sensor systems 16a ... 16n are mounted on a common platform 24, and an acceleration reference sensor 26 and a temperature reference sensor 28 are also mounted on the platform 24 and connected to the terminals P1, P2.

The platform 24 is mounted on a commercially available shaker 25 forming part of the above-identified calibration system and is enclosed in a commercially available environmental chamber 29.

The outputs of the sensors 10, 26 and 28 are connected through a multiplexer 30 to a computer 32.

In addition, the outputs of the microprocessors 14 are also connected, as shown, to the computer 32.

With the sensor systems thus mounted and connected to the computer 32, they are subjected to different stimuli and, more particular, to acceleration and temperature variations, in succession. The outputs of the sensors 10 are compared in the computer 32 with reference values obtained from the acceleration reference sensor 26 and the temperature reference sensor 28. The computer 32 then supplies correction values to the respective microprocessors 14 for storage in the microprocessors 14.

The multiplexer 30 may also comprises an analogue-to-digital converter to convert the outputs of the sensors 26 and 28 to digital values if these sensors do not have digital outputs.

The computer 32 may be implemented by any general purpose computer, for example a Hewlit Packard HP 9836 computer.

Figure 4:
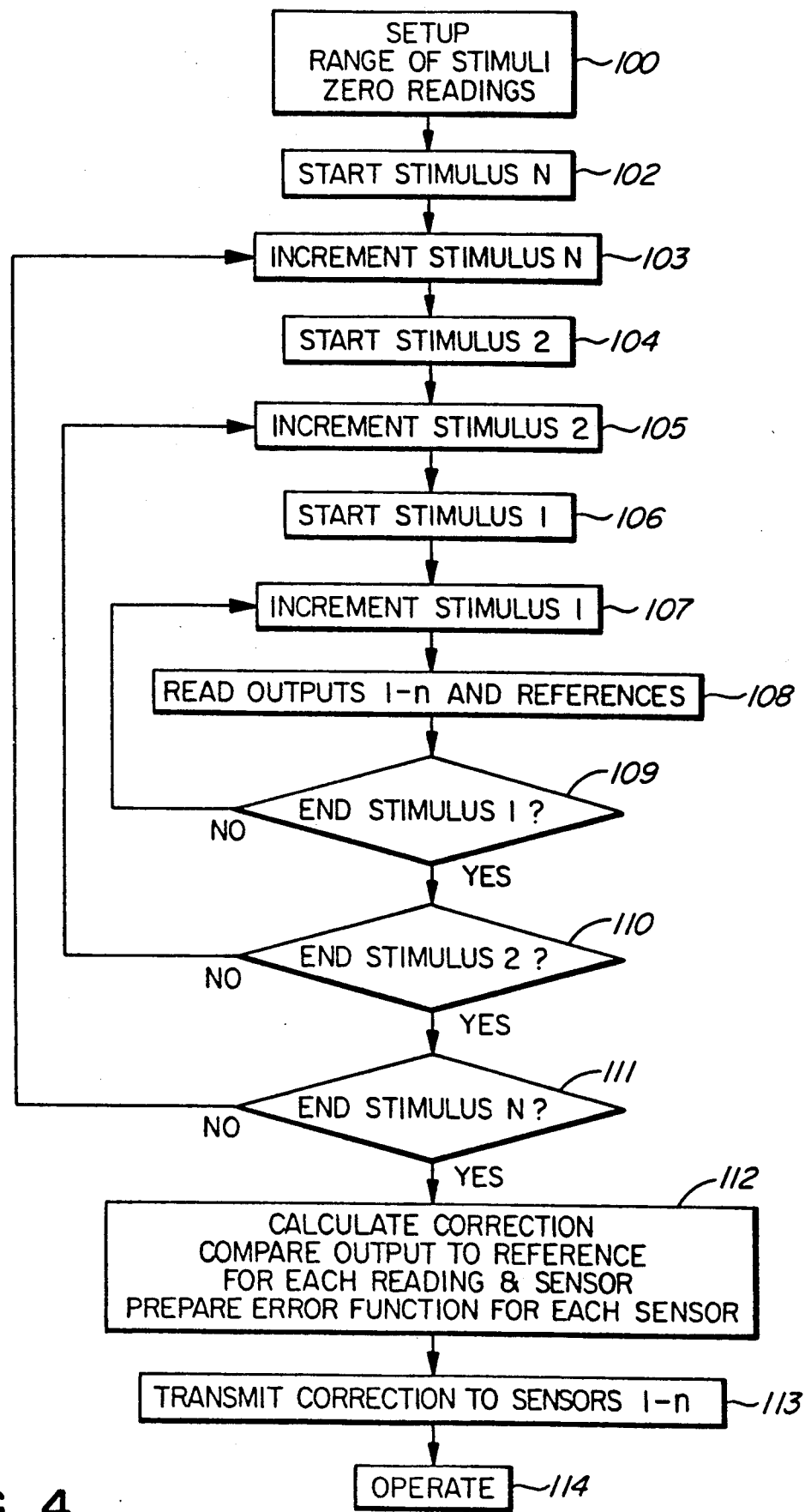

The flow chart of FIG. 4 illustrates in greater detail the method of calibration performed by the apparatus of FIG. 2.

In a first step 100, N stimuli, such as acceleration and temperature variation, are set up, and these stimuli are then each started up and incremented in succession in steps 102 through 107. The outputs of the sensor systems 16a ... 16n, and the reference sensors 26 and 28, are read with the computer in step 108, where they are compared in steps 109 through 111. The computer 32 calculates the correction values in step 112, transmits these values to the sensor systems 16a ... 16n in step 113 and completes the operation in step 114.

I claim:

1. A method of manufacturing a calibrated sensor unit, comprising the steps of:
    providing a micro-machined sensor in die form;
    providing a microprocessor in die form;

mounting said die form sensor and said die form microprocessor on a common substrate and connecting said sensor and said microprocessor together as components of a sensor unit;

providing a reference sensor as a reference unit;

connecting said sensor unit and said reference unit to means for comparing outputs from said sensor unit and said reference unit;

subjecting said sensor unit and said reference unit to a stimulus to obtain a sensor unit output from said microprocessor and a reference unit output from said reference unit;

comparing the sensor unit output with the reference unit output in said comparing means to obtain correction data for calibrating the sensor unit output;

storing said correction data in said microprocessor for use in calibrating said sensor unit during subsequent use of said sensor unit;

disconnecting said sensor unit from said reference unit; and packaging said sensor unit and said microprocessor on said substrate as a single package.

2. A method as claimed in claim 1, which includes connecting said sensor unit and a plurality of additional sensor units similar thereto to said comparing means, simultaneously subjecting said sensor units to the stimulus, employing said comparing means to compare outputs of each of said sensor units to the reference unit output to obtain correction data and storing the correction data in said sensor units.

* * * * *